United States Patent
Kuntimaddi

(10) Patent No.: US 6,943,213 B2
(45) Date of Patent: Sep. 13, 2005

(54) POLYALKYLACRYLATE COMPOUNDS FOR USE IN GOLF BALLS

(75) Inventor: Manjari Kuntimaddi, Mattapoisett, MA (US)

(73) Assignee: Acushnet Company, Fairhaven, MA (US)

(*) Notice: Subject to any disclaimer, the term of this patent is extended or adjusted under 35 U.S.C. 154(b) by 75 days.

(21) Appl. No.: 10/640,532

(22) Filed: Aug. 13, 2003

(65) Prior Publication Data

US 2005/0038190 A1 Feb. 17, 2005

(51) Int. Cl.$^7$ .............. A63B 37/12; A63B 37/14; C08G 18/62
(52) U.S. Cl. ............. 525/127; 525/123; 525/131; 528/61; 528/65; 528/66; 528/75; 473/371; 473/374; 473/378
(58) Field of Search .................. 525/123, 127, 525/131; 528/61, 65, 66, 75; 473/371, 374, 378

(56) References Cited

U.S. PATENT DOCUMENTS

| | | | |
|---|---|---|---|
| 5,133,898 A | 7/1992 | Fock et al. | 252/356 |
| 5,273,676 A | 12/1993 | Boeckh et al. | 252/174 |
| 5,338,485 A | 8/1994 | Fock et al. | 252/309 |
| 6,001,424 A | 12/1999 | Lettmann et al. | 427/407 |
| 6,001,915 A | 12/1999 | Schwarte et al. | 524/457 |
| 6,146,288 A | 11/2000 | Crast et al. | 473/377 |
| 6,210,295 B1 | 4/2001 | Yoneyama | 473/378 |
| 6,454,667 B1 | 9/2002 | Iwami | 473/378 |
| 6,509,410 B2 | 1/2003 | Ohira et al. | 524/591 |
| 6,540,624 B1 | 4/2003 | Isogawa | 473/371 |
| 2001/0031369 A1 | 10/2001 | Reusmann | 428/483 |
| 2002/0098290 A1 | 7/2002 | Simonds et al. | 427/385 |
| 2002/0193507 A1 | 12/2002 | Reusmann | 524/589 |
| 2003/0004264 A1 | 1/2003 | Maier et al. | 524/839 |
| 2003/0045378 A1 | 3/2003 | Bissonnette et al. | 473/378 |
| 2003/0064826 A1 | 4/2003 | Voorheis et al. | 473/367 |

*Primary Examiner*—David J. Buttner

(57) ABSTRACT

A golf ball comprising a core and a cover, wherein the cover comprises a thermoplastic or thermoset composition comprising a polyurethane prepolymer or polyurea prepolymer formed from an isocyanate and a polyacrylate polyol or polyacrylate polyamine, respectively.

28 Claims, No Drawings

POLYALKYLACRYLATE COMPOUNDS FOR USE IN GOLF BALLS

FIELD OF THE INVENTION

The present invention relates to golf balls, and more particularly to novel compositions for a golf ball that comprise polyalkylacrylate compounds.

BACKGROUND OF THE INVENTION

Conventional cover or intermediate layer materials for golf balls include ionomer resins and polyurethanes. Chemically, ionomer resins are a copolymer of an olefin and an ethylenically unsaturated α,β-carboxylic acid having 10 to 100 percent of the carboxylic acid groups neutralized by a metal ion. Polyurethanes are typically formed from a prepolymer of polyol with isocyanate and a curing agent. Ionomer covers are virtually cut-proof, but they provide inferior spin and feel to the golf balls.

Polyurethanes are typically formed from polyols, isocyanates, and curing agents. These compounds can be mixed together in the one-shot method to form the polyurethanes. A preferred alternative method involves a two-stage process, in which the polyol is first reacted with the isocyanate to form a polyurethane prepolymer, and then the prepolymer is reacted with the curing agent to afford the polyurethane. Conventional polyurethane covers generally have excellent feel and good durability, but are inferior in resilience when compared to ionomer covers. The employment of aromatic compounds in conventional polyurethane covers typically results in their lack of weatherability in general and light stability in particular. The color instability caused by both thermo-oxidative degradation and UV-induced photodegradation typically results in "yellowing" or "browning" of the polyurethane cover, an undesirable characteristic for golf ball covers, which are generally white.

Polyacrylate polyols are capable of providing improved lightfastness in polyurethane compositions, and are suitable for use in golf balls. Conventional polyacrylate polyols are copolymers comprising hydroxyl-group-containing acrylic monomers. Typically, the acrylic monomer is a hydroxyalkyl acrylate or hydroxyalkyl methacrylate, wherein the hydroxyalkyl group is hydroxyethyl, hydroxypropyl, hydroxybutyl, and the likes thereof. One limitation of these conventional polyacrylate polyols is the random distribution of the hydroxyl groups throughout the backbone of the polymer, such that they can not be used for the synthesis of linear polyurethanes. The high level of hydroxyl functionality of these polyacrylate polyols may result in premature gelling when they are reacted with isocyanates. Polyurethanes using such polyacrylate polyols have high crosslinking density, high hardness, high glass transition temperature, and poor flexibility, which limit their application in golf balls and other sport equipment.

Therefore, a continuing need remains for golf ball materials and compositions with superior resistance to cut, scratch, abrasion, discoloration, moisture, and other wearing and weathering elements that provide improved performance characteristics such as resilience and feel to the golf ball. It would be particularly desirable to incorporate polyacrylate compounds having terminal isocyanate-reactive functional groups and low active hydrogen functionality.

SUMMARY OF THE INVENTION

The present invention is directed to a golf ball having a core and a cover. The cover comprises a thermoplastic or thermoset composition of a polyurethane prepolymer or polyurea prepolymer formed from an isocyanate and a polyacrylate polyol or polyacrylate polyamine, respectively. The polyacrylate polyamine is preferably derived from the polyacrylate polyol through, for example, an amination process. The polyacrylate polyol or polyamine has at least one acrylate segment of the following structure:

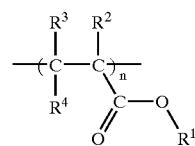

where $R^1$ to $R^4$ are independently hydrogen, aliphatic, alicyclic, aromatic, carbocyclic, heterocyclic, halogenated, perfluoroalkyl, dialkylaminoalkyl, or substituted moieties, each having less than about 20 carbon atoms; and n is an integer from about 2 to about 300. Preferably, $R^1$ is alkyl or cycloalkyl moieties such as methyl, ethyl, propyl, isopropyl, n-butyl, sec-butyl, t-butyl, hexyl, methylhexyl, ethylhexyl, n-amyl, isoamyl, n-octyl, stearyl, lauryl, or cyclohexyl moieties; $R^2$ is hydrogen or methyl moiety; and $R^3$ and $R^4$ are independently hydrogen or saturated moieties. $R^1$ can also represent a perfluoroalkyl group, such as trifluoroethyl, pentafluoropropyl, nonafluorohexyl, or tridecafluorooctyl groups, or a dialkylaminoalkyl group, such as dimethylaminoethyl or diethylaminoethyl groups.

Preferred polyacrylate polyols are polyacrylate telechelics such as α,ω-polyacrylate diols having a formula of:

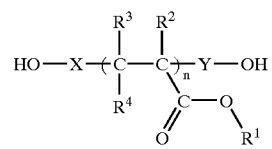

preferred polyacrylate polyamines are polyacrylate telechelics such as α,ω-polyacrylate diamines having a formula of:

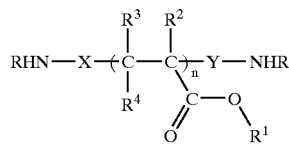

and preferred polyacrylate aminoalcohols are polyacrylate telechelics such as α,ω-polyacrylate aminoalcohols having a formula of:

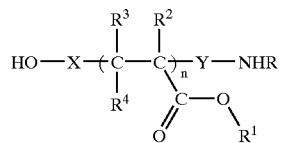

where $R^1$ to $R^4$ are independently hydrogen, aliphatic, alicyclic, aromatic, carbocyclic, heterocyclic, halogenated, or substituted moieties, each having less than about 20 carbon atoms; X and Y are independently alkyl, aryl, mercaptoalkyl, ether, ester, carbonate, acrylate, halogenated, or substituted moieties; R is hydrogen, alkyl, aryl, or epoxy; and n is an integer from about 2 to about 300. Preferably, $R^1$ to $R^4$ are independently hydrogen or saturated moieties.

Exemplary α,ω-polyacrylate diols include α,ω-polymethylmethacrylate diol, α,ω-polybutylmethacrylate diol, and α,ω-polyethylhexylmethacrylate diol. Exemplary α,ω-polyacrylate diamines include α,ω-polymethylmethacrylate diamine, α,ω-polybutylmethacrylate diamine, and α,ω-polyethylhexylmethacrylate diamine. Exemplary α,ω-polyacrylate aminoalcohols include α-amino-ω-hydroxy-polyalkylacrylate and α-amino-ω-hydroxy-polyalkylmethacrylate, The polyacrylate polyol or polyamine may also be a random, block, or graft copolymer further having a long-chain hydrocarbon or an oxyalkylene segment of the following structure:

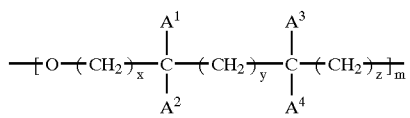

where $A^1$ to $A^4$ are independently hydrogen, alkyl, alkoxy, cycloalkyl, aromatic, heterocyclic, halogenated, or substituted moieties; x, y, and z are independently zero or integers from about 1 to about 10; and m is an integer from 2 to about 300. Preferably, at least one of $A^1$ to $A^4$ is an alkyl or cycloalkyl moiety having 1 to about 10 carbon atoms. In one embodiment, the oxyalkylene segment is substantially saturated. Examples of such copolymers include telechelic diols and diamines having a copolymeric backbone comprising a polytetramethylene ether glycol segment and at least one polyalkylacrylate segment or polyalkylmethacrylate segment.

The polyacrylate telechelics of the present invention preferably have a glass transition temperature of less than about −10° C., more preferably less than about −30° C., and a molecular weight of about 200 to about 20,000, more preferably about 500 to about 10,000, and most preferably about 1,000 to about 5,000. When used alone or in a blend and reacted to isocyanates at an equivalent ratio of about 0.01:1 to about 1:1, the polyacrylate diols afford polyurethane prepolymers, the polyacrylate polyamines afford polyurea prepolymers, and the polyacrylate aminoalcohols afford polyurethane/polyurea prepolymers. Suitable isocyanates are saturated, aliphatic, alicyclic, unsaturated, araliphatic, aromatic, substituted, or unsubstituted, comprising isocyanate-containing monomers, dimers, trimers, adducts, condensates, oligomers, polymers, prepolymers, low-free-monomer prepolymers, quasi-prepolymers, diisocyanates, polyisocyanates, biurets, uretdiones, isocyanurates, or blends thereof. Suitable polyahls for blends with the polyacrylate polyahls, including polyols for polyurethane formulations and polyamines for polyurea formulations, are polyether polyahls, polyester polyahls, polycaprolactone polyahls, polycarbonate polyahls, polyhydrocarbon polyahls, polyamide polyahls, polyolefin polyahls, polyamide polyahls, poly(organo)siloxane polyahls, and polyahls converted from acid functional oligomers or polymers or ionomers thereof.

The prepolymers are then reacted with curing agents at an equivalent ratio therebetween of about 1:0.6 to about 1:1.5 to form polyurethanes, polyureas, or polyurethane/polyurea hybrids. Suitable curing agents include saturated or unsaturated monomeric polyahls, oligomeric polyahls, polyether polyahls, polyester polyahls, polycaprolactone polyahls, polycarbonate polyahls, polyhydrocarbon polyahls, polyamide polyahls, polyolefin polyahls, polyamide polyahls, poly(organo)siloxane polyahls, polyahls converted from acid functional oligomers or polymers or ionomers thereof, diols, triols, tetraols, polyols, diamines, triamines, tetramines, polyamines, aminoalcohols, and epoxies.

Alternatively, the polyacrylate telechelics of the present invention are used as curing agents, alone or in a blend with other curing agents, to cure a polyurethane prepolymer or polyurea prepolymer into a thermoplastic or thermoset composition. As curing agents, the polyacrylate telechelics preferably has a molecular weight of less than about 5,000. The prepolymer is formed from a polyahl and an isocyanate, with an equivalent ratio therebetween of about 0.3:1 to about 0.6:1. Suitable polyahls, including polyols for polyurethanes and polyamines for polyureas, are polyether polyahls, polyester polyahls, polycaprolactone polyahls, polycarbonate polyahls, polyhydrocarbon polyahls, polyolefin polyahls, polyamide polyahls, poly(organo)siloxane polyahls, polyacrylate polyahls, and polyahls converted from acid functional oligomers or polymers or ionomers thereof. Suitable isocyanates include those discussed above.

When used in the cover compositions of the invention, the isocyanates, the polyacrylate telechelics, the curing agents, and the reactive product formed therefrom are preferably all substantially saturated. The compositions preferably have a material hardness of greater than about 30 Shore D and a water vapor transmission rate of less than about 2 g/(m²× day).

The cover compositions disclosed herein are preferably used in golf ball cover layers such as inner cover layers and/or outer cover layers. They may also be used in, when present, other portions of the golf ball. For examples, the polyacrylate telechelics may be used in polyurethane or polyurea compositions that form a coating layer of the golf ball, on the outer surface of the cover. Due to their unique physical properties as described below, they can be applied as an outer core layer, a barrier layer (against the passing of water vapor or other gaseous matter like oxygen gas), or an intermediate layer, typically disposed within or between the core and the cover of the golf ball. The reactants of such compositions, including the polyacrylate telechelics, the isocyanate, and the curing agent are preferably substantially saturated.

The golf ball may incorporate any construction known to the skilled in the art. In one embodiment, the golf ball cover has an outer cover layer and at least one inner cover layer. At least one of these cover layers comprises a polyacrylate telechelic-based composition of the invention. The outer and inner cover layers are preferably different in at least their hardness. For example, the inner cover layer incorporates the polyacrylate telechelic-based composition and has a first material hardness of about 50 Shore D to about 100 Shore D, while the outer cover layer is formed from a polyurethane or polyurea having a second material hardness of about 30 Shore D to about 70 Shore D and a flexural modulus of about 10,000 psi to about 80,000 psi, and the first material hardness is greater than the second material hardness. Preferably, each of the cover layers has a thickness of less than about 0.05 inches.

The core of the golf ball preferably has a diameter of about 1.5 inches to about 1.65 inches. The core may have a center and one or more outer core layers. The center preferably has a diameter of about 0.5 inches to about 1.5 inches. The outer core layer preferably has a thickness of about 0.01 inches to about 0.5 inches.

Definitions

As used herein, the term "polyahl" or "reactive polyahl" refers to any one compound or a mixture of compounds containing a plurality of active hydrogen moieties per molecule. Illustrative of such active hydrogen moieties are —OH (hydroxy group), —SH (thio group), —COOH (carboxylic acid group), and —NHR (amine group), with R being hydrogen, alkyl, aryl, or epoxy; all of which may be primary or secondary. These active hydrogen moieties are reactive to free isocyanate groups, forming urethane, urea, thiourea, or corresponding linkage depending on the particular active hydrogen moiety being reacted. The polyahls may be monomers, homo-oligomers, co-oligomers, homopolymers, or copolymers. Oligomeric and polymeric polyahls having at least one NCO-reactive group on each terminal of a backbone are typically employed as the soft segment in reaction products such as polyureas and polyurethanes. Depending on the terminal groups, the oligomeric and polymeric polyahls may be identified as polyols (with —OH terminals only), polyamines (with —NHR terminals only), or aminoalcohol oligomers or polymers (with both —OH and —NHR terminals). Such polyahls with a relatively low molecular weight (less than about 5,000), and a wide variety of monomeric polyahls, are commonly used as curing agents. The polyahls are generally liquids or solids meltable at relatively low temperatures.

As used herein, the term "saturated" or "substantially saturated" means that the compound or material of interest is fully saturated (i.e., contains no double bonds, triple bonds, or aromatic ring structures), or that the extent of unsaturation is negligible, e.g. as shown by a bromine number in accordance with ASTM E234-98 of less than 10, preferably less than 5.

As used herein, the term "percent NCO" or "% NCO" refers to the percent by weight of free, reactive, and unreacted isocyanate functional groups in an isocyanate-functional molecule or material. The total formula weight of all the NCO groups in the molecule or material, divided by its total molecular weight, and multiplied by 100, equals the percent NCO.

As used herein, the term "equivalent" is defined as the number of moles of a functional group in a given quantity of material, and calculated from material weight divided by equivalent weight, the later of which refers to molecular weight per functional group. For isocyanates the equivalent weight is (4210 grams)/% NCO; and for polyols, (56100 grams)/OH#.

As used herein, the term "flexural modulus" or "modulus" refers to the ratio of stress to strain within the elastic limit (measured in flexural mode) of a material, indicative of its bending stiffness, and is similar to tensile modulus. Flexural modulus, typically reported in Pascal ("Pa") or pounds per square inches ("psi"), is derived in accordance to ASTM D6272-02.

As used herein, the term "water vapor transmission rate" ("WVTR") refers to the mass of water vapor that diffuses into a material of a given thickness per unit area per unit time at a specific temperature and humidity differential. Standard tests for WVTR include ASTM E96-00.

As used herein, the term "material hardness" refers to indentation hardness of non-metallic materials in the form of a flat slab or button as measured with a durometer. The durometer has a spring-loaded indentor that applies an indentation load to the slab, thus sensing its hardness. The material hardness can indirectly reflect upon other material properties, such as tensile modulus, resilience, plasticity, compression resistance, and elasticity. Standard tests for material hardness include ASTM D2240-02b. Unless otherwise specified, material hardness reported herein is in Shore D. Material hardness is distinct from the hardness of a golf ball portion as measured directly on the golf ball (or other spherical surface). The difference in value is primarily due to the construction, size, thickness, and material composition of the golf ball components (i.e., center, core and/or layers) that underlie the portion of interest. One of ordinary skill in the art would understand that the material hardness and the hardness as measured on the ball are not correlated or convertible.

As used therein, the term "compression," also known as "ATTI compression" or "PGA compression," refers to points derived from a Compression Tester (ATTI Engineering Company, Union City, N.J.), a scale well known in the art for determining relative compression of a spherical object. Compression is a property of a material as measured on a golf ball construction (i.e., on-ball property), not a property of the material per se.

As used herein, the term "coefficient of restitution" or "COR" for golf balls is defined as the ratio of a ball's rebound velocity to its initial incoming velocity when the ball is fired out of an air cannon into a rigid vertical plate. The faster a golf ball rebounds, the higher the COR it has, the more the total energy it retains when struck with a club, and the longer the ball flies. The initial velocity is about 50 ft/s to about 200 ft/s, and is usually understood to be 125 ft/s, unless otherwise specified. A golf ball may have different COR values at different initial velocities.

The term "about," as used herein in connection with one or more numbers or numerical ranges, should be understood to refer to all such numbers, including all numbers in a range.

DETAILED DESCRIPTION OF THE INVENTION

The cover of a golf ball generally should provide sufficient strength for good performance characteristics and durability. Desirable properties for the cover include good moldability, high abrasion resistance, high tear strength, and high resilience. The cover may have a single-layer construction, or a multi-layer construction that includes one or more inner cover layers and an outer cover layer. The material compositions described herein, while applicable in any portion of the golf ball, are preferably used to form cover layers, including single-layer covers, inner cover layers, and/or outer cover layers. Alternatively, when properly formulated, the compositions may be used to form coating layers about the golf ball cover. Such a coating layer typically has a thickness of less than about 0.01 inches, preferably about 0.001 inches to about 0.01 inches.

The cover layer, particularly the outer cover layer, of the present invention may comprise about 1 weight percent to about 100 weight percent, preferably about 5 weight percent to about 95 weight percent, of a thermoplastic or thermoset composition. The composition, preferably formed from a castable liquid reactive material, comprises a compound having at least one acrylate segment and two or more active hydrogen groups that are reactive to isocyanate groups. Preferably the acrylate segment is present in the backbone of the compound. Such compounds, referred to herein as polyacrylate polyahls, include oligomers and polymers such as polyacrylate polyols (including polyacrylate diols), polyacrylate polyamines (including polyacrylate diamines), and polyacrylate aminoalcohols. In one embodiment, the cover composition comprises a reaction product of a polyurethane prepolymer and a curing agent, the former further being a reaction product of an isocyanate and a polyacrylate polyol such as the $\alpha,\omega$-polyacrylate diols described below.

The acrylate segment of the polyacrylate polyol typically has a structure (I) of:

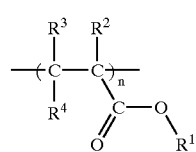
(I)

where $R^1$ to $R^4$ are independently hydrogen, aliphatic, alicyclic, aromatic, carbocyclic, heterocyclic, halogenated, or substituted moieties, each having less than about 20 carbon atoms; and n is an integer from about 2 to about 300. In one embodiment, $R^1$ to $R^4$ are independently hydrogen or saturated moieties. In particular, $R^1$ is an alkyl or cycloalkyl moiety, such as methyl, ethyl, propyl, isopropyl, n-butyl, sec-butyl, t-butyl, hexyl, methylhexyl, ethylhexyl, n-amyl, isoamyl, n-octyl, stearyl, lauryl, or cyclohexyl groups, and $R^2$ is hydrogen or methyl group. $R^1$ can also represent a perfluoroalkyl group, such as trifluoroethyl, pentafluoropropyl, nonafluorohexyl, or tridecafluorooctyl groups, or a dialkylaminoalkyl group, such as dimethylaminoethyl or diethylaminoethyl groups.

Preferably, the polyacrylate polyol is an α,ω-polyacrylate diol (i.e., a telechelic) having a formula (II) of:

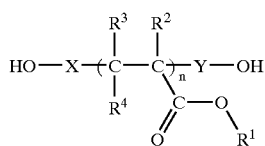
(II)

where $R^1$ to $R^4$ are independently hydrogen, aliphatic, alicyclic, aromatic, carbocyclic, heterocyclic, halogenated, or substituted moieties, each having less than about 20 carbon atoms; X and Y are independently alkyl, aryl, mercaptoalkyl, ether, ester, carbonate, acrylate, halogenated, or substituted moieties; and n is an integer from about 2 to about 300. Preferred α,ω-polyacrylate diols include α,ω-polyalkylacrylate diols and α,ω-polyalkylmethacrylate diols, such as α,ω-polymethylmethacrylate diol, α,ω-polybutylmethacrylate diol, and α,ω-polyethylhexylmethacrylate diol. Exemplary α,ω-polyalkylmethacrylate diols as listed below in Table I (Tego® Diols) are commercially available from Goldschmidt Chemical Corporation of Hopewell, Va.

TABLE I

| Tego ® Diol | Monomer | Molecular Weight (g/mol) | Tg (° C.) | Viscosity (mPas/80° C.) |
|---|---|---|---|---|
| MD-1000 | methylmethacrylate | 1000 | 20 | 56,000 |
| BD-1000 | n-butylmethacrylate | 1000 | −30 | 2,400 |
| BD-2000 | n-butylmethacrylate | 2000 | −10 | 36,000 |
| OD-2000 | 2-ethylhexylmethacrylate | 2000 | −30 | 6,400 |

The polyacrylate polyol may also be a random, block, or graft copolymer further having a long-chain hydrocarbon, and/or an oxyalkylene segment (i.e., a polyether segment) comprising a plurality of oxyalkylene monomer units, preferably also present in the backbone and adjacent to the acrylate segment described above. The oxyalkylene segment typically has the following structure (III):

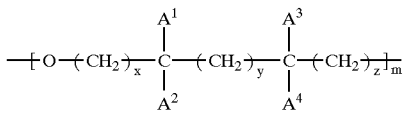
(III)

where $A^1$ to $A^4$ are independently hydrogen, alkyl, alkoxy, cycloalkyl, aromatic, heterocyclic, halogenated, or substituted moieties; x, y, and z are independently zero or integers from about 1 to about 10; and m is an integer from 2 to about 300. Preferably, at least one of $A^1$ to $A^4$ is an alkyl or cycloalkyl moiety having 1 to about 10 carbon atoms. In one embodiment, the oxyalkylene segment is substantially saturated. Exemplary linear and branched oxyalkylene monomer units include, but are not limited to: —O—CH$_2$—CH$_2$—CH$_2$—CH$_2$—, —O—CH$_2$—CH$_2$—CH$_2$—, —O—CH$_2$—CH$_2$—, —O—CH$_2$—CH(CH$_3$)—CH$_2$—CH$_2$—, —O—CH$_2$—CH$_2$—CH(CH$_3$)—CH$_2$—, —O—CH(CH$_3$)—CH$_2$—CH$_2$—CH$_2$—, —O—CH$_2$—CH$_2$—CH$_2$—CH(CH$_3$)—, —O—CH(CH$_3$)—CH$_2$—CH$_2$—, —O—CH$_2$—CH(CH$_3$)—CH$_2$—, —O—CH$_2$—CH$_2$—CH(CH$_3$)—, —O—C(CH$_3$)$_2$—CH$_2$—, —O—CH$_2$—C(CH$_3$)$_2$—, —O—CH(CH$_2$CH$_3$)—CH$_2$—, —O—CH$_2$—CH(CH$_2$CH$_3$)—, —O—CH(CH$_3$)—CH$_2$—, —O—CH$_2$—CH(CH$_3$)—, and —O—CH$_2$—CH$_2$—CH$_2$—CH$_2$—CH$_2$—.

Preferred polyacrylate polyols of such a structure include telechelic diols having a copolymeric backbone of at least one polyalkylacrylate segment or polyalkylmethacrylate segment and a polytetramethylene ether glycol segment, and polyacrylate copolymers as disclosed in U.S. Pat. Nos. 5,338,485, 5,273,676, and 5,133,898, which are incorporated by reference herein in their entirety.

The polyacrylate polyols as described above may be converted into polyacrylate polyamines by replacing the terminal hydroxyl groups with amine groups through, for example, an amination reaction. The polyacrylate polyamines may then be reacted with isocyanates to form polyurea prepolymers, suitable for polyurea compositions in golf ball applications. In particular, the α,ω-polyacrylate diol (II) may be aminated into an α,ω-polyacrylate diamine having a formula (IV) of:

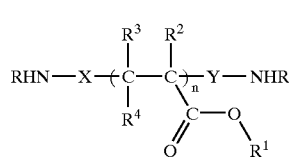
(IV)

where $R^1$ to $R^4$ are independently hydrogen, aliphatic, alicyclic, aromatic, carbocyclic, heterocyclic, halogenated, or substituted moieties, each having less than about 20 carbon atoms; X and Y are independently alkyl, aryl, mercaptoalkyl, ether, ester, carbonate, acrylate, halogenated, or substituted moieties; R is hydrogen, alkyl, aryl, or epoxy; and n is an integer from about 2 to about 300. Copolymeric polyacrylate polyamines having the oxyalkylene segment (III) above, preferably in the backbone, may also be derived using the likes of the amination reaction. Preferred telechelic polyacrylate polyamines include α,ω-polyalkylacrylate diamines, α,ω-polyalkylmethacrylate diamines, and α,ω-polyacrylate diamines having a copolymer backbone of polyalkylacrylate or polyalkylmethacrylate and polytetramethylene ether glycol. Preferably, the resulting polyacrylate polyamines are substantially saturated.

Furthermore, α,ω-polyacrylate telechelics having different α and ω functionalities, including polyacrylate aminoalcohols such as α-amino-ω-hydroxy-polyalkylacrylate and α-amino-ω-hydroxy-polyalkylmethacrylate, are also within the scope of the present invention. For example, selective amination of one of the two hydroxyl terminal groups of the α,ω-polyacrylate diol (II) can yield an α,ω-polyacrylate aminoalcohol having a formula (V) of:

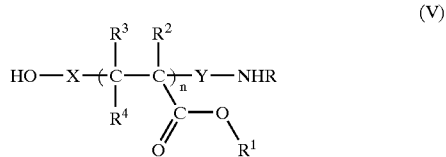

(V)

where $R^1$ to $R^4$ are independently hydrogen, aliphatic, alicyclic, aromatic, carbocyclic, heterocyclic, halogenated, or substituted moieties, each having less than about 20 carbon atoms; X and Y are independently alkyl, aryl, mercaptoalkyl, ether, ester, carbonate, acrylate, halogenated, or substituted moieties; R is hydrogen, alkyl, aryl, or epoxy; and n is an integer from about 2 to about 300. Preferably, the polyacrylate aminoalcohols are substantially saturated.

The α,ω-polyacrylate telechelics of the present invention, including the polyacrylate polyols, the polyacrylate polyamines, and the polyacrylate aminoalcohols, may further comprise substituted groups or moieties. Suitable substitution groups or moieties include, without limitation, fluoride, chloride, bromide, iodide, cyanide, sulfide, silicone, carboxylate, sulfonate, phosphonate, acrylate, methacrylate, epoxy, hydrocarbon, fluorocarbon, halogenated polyether, polyalkylene oxide, aromatic, or vinyl groups or moieties; urethane or urea units; terminal or pendant functional groups or moieties, such as primary or secondary hydroxyl groups, primary or secondary amine groups, isocyanate groups, (meth)acrylate groups, epoxy groups, neutralized or un-neutralized acid groups, or ethylenically unsaturated polymerizable groups. These units, groups, moieties, or combinations thereof may be present in the telechelics to provide enhanced functionality and/or reactivity.

The unique structural and compositional characteristics of the α,ω-polyacrylate telechelics result in their physical, chemical, thermal, and other properties that are desirable and advantageous in golf ball applications. In particular, these α,ω-polyacrylate telechelics combine positive properties of ester and acrylate structures in one single macromolecule and therefore embody advantages of both polyesters and polyacrylates. Depending on the formulation, the α,ω-polyacrylate telechelics exhibit high hardness, improved scratch resistance, increased flexibility, good humidity stress resistance (low MVTR), improved hydrolysis resistance, and enhanced weatherability. The α,ω-polyacrylate telechelics of the present invention preferably have a glass transition temperature of less than about −10° C., more preferably less than about −30° C.; and a molecular weight of about 200 to about 20,000, more preferably about 500 to about 10,000, and most preferably about 1,000 to about 5,000. The cover compositions comprising the α,ω-polyacrylate telechelics preferably have a flexural or elastic modulus of at least about 1,000 psi; a material hardness of at least about 30 Shore D; and a water vapor transmission rate of less than about 2 g/(m²×day). Compositions having a Shore D hardness of about 30 to about 70 are preferred for outer cover layers, while compositions having a Shore D hardness of about 50 to about 100 are preferred for inner cover layers. More preferably, the inner cover layer is harder than the outer cover layer.

The α,ω-polyacrylate telechelics of the present invention, alone or in a blend, may be reacted with an isocyanate to form a prepolymer having a NCO content of less than about 30 percent, preferably less than about 15 percent. One skilled in the art would understand that the α,ω-polyacrylate diols, alone or in combination with other diols or polyols, may react with one or more isocyanates to form a polyurethane prepolymer or a blend thereof. Alternatively, the α,ω-polyacrylate diamines, alone or in combination with other diamines or polyamines, may react with one or more isocyanates to form a polyurea prepolymer or a blend thereof. When the α,ω-polyacrylate aminoalcohols are used, the resulting prepolymer or a blend thereof is of the polyurethane/polyurea hybrid type.

Any isocyanate available to one of ordinary skill in the art is suitable for use according to the invention. The isocyanate may be organic, modified organic, saturated, aliphatic, alicyclic, unsaturated, aralphatic, aromatic, substituted, or unsubstituted diisocyanate or polyisocyanate monomers having two or more free reactive isocyanate ("NCO") groups; isomers thereof; modified derivatives thereof; dimers thereof; trimers thereof; or isocyanurates thereof. The isocyanate may also include any isocyanate-terminated multimeric adducts, oligomers, polymers, prepolymers, low-free-monomer prepolymers, quasi-prepolymers, and modified polyisocyanates derived from the isocyanates and polyisocyanates above. Low-free-monomer prepolymers refer to prepolymers having free isocyanate monomer levels less than about 0.5 weight percent.

In addition to the free reactive isocyanate groups, the suitable isocyanate further comprises at least one cyclic, aromatic, aliphatic, linear, branched, or substituted hydrocarbon moiety containing from 1 to about 20 carbon atoms, such as arylenes, aralkylenes, alkylenes, or cycloalkylenes. When multiple cyclic or aromatic groups are present, linear, branched or substituted hydrocarbons containing from 1 to about 10 carbon atoms can be present as spacers between such cyclic or aromatic groups. In some cases, the cyclic or aromatic group(s) may be substituted at the 2-(ortho-), 3-(meta-), and/or 4-(para-) positions. Substituted groups may include, but are not limited to, halogens, cyano groups, amine groups, silyl groups, hydroxyl groups, acid groups, alkoxy groups, primary or secondary or tertiary hydrocarbon groups, or a combination of two or more groups thereof. Any and all of the isocyanates disclosed herein may be used alone or in combination of two or more thereof.

Preferred isocyanates include diisocyanates (having two NCO groups per molecule), dimerized uretdiones thereof, trimerized isocyanurates thereof, and polyisocyanates such as monomeric triisocyanates. Exemplary diisocyanates include, but are not limited to, unsaturated isocyanates such as: p-phenylene diisocyanate ("PPDI," i.e., 1,4-phenylene diisocyanate), m-phenylene diisocyanate ("MPDI," i.e., 1,3-phenylene diisocyanate), o-phenylene diisocyanate (i.e., 1,2-phenylene diisocyanate), 4-chloro-1,3-phenylene diisocyanate, toluene diisocyanate ("TDI"), m-tetramethylxylene diisocyanate ("m-TMXDI"), p-tetramethylxylene diisocyanate ("p-TMXDI"), 1,2-, 1,3-, and 1,4-xylene diisocyanates, 2,2'-, 2,4'-, and 4,4'-biphenylene diisocyanates, 3,3'-dimethyl-4,4'-biphenylene diisocyanate ("TODI"), 2,2'-, 2,4'-, and 4,4'-diphenylmethane diisocyanates ("MDI"), 3,3'-dimethyl-4, 4'-diphenylmethane diisocyanate, carbodiimide-modified MDI, polyphenylene polymethylene polyisocyanate ("PMDI," i.e., polymeric MDI), 1,5-naphthalene diisocyanate ("NDI"), 1,5-tetrahydronaphththalene diisocyanate, anthracene diisocyanate, tetracene diisocyanate; and saturated isocyanates such as: 1,4-tetramethylene diisocyanate, 1,5-pentamethylene diisocyanate, 2-methyl-1,5-pentamethylene diisocyanate, 1,6-hexamethylene diisocyanate ("HDI") and isomers thereof, 2,2,4- and 2,4,4-trimethylhexamethylene diisocyanates, 1,7-heptamethylene diisocyanate and isomers thereof, 1,8-octamethylene diisocyanate and isomers thereof, 1,9-novamethylene diisocyanate and isomers thereof, 1,10-decamethylene diisocyanate and isomers thereof, 1,12-dodecane diisocyanate and isomer thereof, 1,3-cyclobutane diisocyanate, 1,2-, 1,3-, and 1,4-cyclohexane diisocyanates, 2,4- and 2,6-methylcyclohexane diisocyanates ("HTDI"), isophorone diisocyanate ("IPDI"), isocyanatomethylcyclohexane isocyanate, isocyanatoethylcyclohexane isocyanate, bis(isocyanatomethyl)cyclohexane (i.e., 1,4-cyclohexane-bis(methylene isocyanate)), 4,4'-dicyclohexylmethane diisocyanate ("$H_{12}$MDI," i.e., bis(4-isocyanatocyclohexyl)-methane), 2,4'- and 4,4'-dicyclohexane diisocyanates, 2,4'- and 4,4'-bis (isocyanatomethyl) dicyclohexanes. Dimerized uretdiones of diisocyanates and polyisocyanates include, for example, unsaturated isocyanates such as uretdiones of toluene diisocyanates, uretdiones of diphenylmethane diisocyanates; and saturated isocyanates such as uretdiones of hexamethylene diisocyanates. Trimerized isocyanurates of diisocyanates and polyisocyanates include, for example, unsaturated isocyanates such as trimers of diphenylmethane diisocyanate, trimers of tetramethylxylene diisocyanate, isocyanurates of toluene diisocyanates; and saturated isocyanates such as isocyanurates of isophorone diisocyanate, isocyanurates of hexamethylene diisocyanate, and isocyanurates of trimethyl-hexamethylene diisocyanates. Monomeric triisocyanates include, for example, unsaturated isocyanates such as 2,4,4'-diphenylene triisocyanate, 2,4,4'-diphenylmethane triisocyanate, 4,4',4"-triphenylmethane triisocyanate; and saturated isocyanates such as 1,3,5-cyclohexane triisocyanate.

Among the above-listed isocyanates, the saturated isocyanates are the most preferred in golf ball outer cover layer or coating compositions. Other suitable isocyanates include aralkyl isocyanates such as 1,2-, 1,3-, and 1,4-xylene diisocyanates, m-tetramethylxylene diisocyanate, p-tetramethylxylene diisocyanate, uretdiones of toluene diisocyanates, isocyanurates of toluene diisocyanates, and isocyanurates of diphenylmethane diisocyanates.

Isocyanate-terminated oligomers or polymers include any oligomers, polymers, prepolymers, or quasi-prepolymers having at least two free reactive isocyanate groups as terminal groups, and optionally more pendant isocyanate groups, on the oligomeric or polymeric backbones. Isocyanate-terminated prepolymers and quasi-prepolymers are well known to the skilled artisan, and include, but are not limited to, the reaction products of any one or combination of two or more of the isocyanates listed above and any one or combination of two or more of the polyahls disclosed herein.

It is well understood in the art that material hardness of golf ball covers comprising polyureas, polyurethanes, and polyurethane/polyurea hybrids may be modified by adjusting the percent NCO content in the isocyanate-terminated prepolymer. Conventionally, the isocyanate-terminated prepolymer has less than about 30% NCO, preferably no greater than about 15% NCO. A percent NCO of about 4% to about 9% may provide a relatively soft elastomer, preferably suitable for use in golf ball covers, outer cover layers, or coating layers. A percent NCO of about 7% to about 15% may provide a relatively hard elastomer, preferably suitable for use in golf ball intermediate layers, outer core layer, and/or inner cover layers.

The above-described α,ω-polyacrylate telechelics, present by about 1 weight percent to about 100 weight percent in a blend, may be blended with one or more polyahls known to one of ordinary skill in the art to form the prepolymers. Suitable polyahls for the blend may be organic, modified organic, saturated, aliphatic, alicyclic, unsaturated, araliphatic, aromatic, substituted, or unsubstituted. The polyahl preferably has two or more reactive hydrogen groups per molecule, such as primary or secondary hydroxy groups or amine groups, and at least one cyclic, aromatic, aliphatic, linear, branched, or substituted hydrocarbon moiety containing from 1 to about 20 carbon atoms, such as arylenes, aralkylenes, alkylenes, or cycloalkylenes. When multiple cyclic or aromatic groups are present, linear, branched or substituted hydrocarbons containing from 1 to about 10 carbon atoms can be present as spacers between such cyclic or aromatic groups. In some cases, the cyclic or aromatic group(s) may be substituted at the 2-(ortho-), 3-(meta-), and/or 4-(para-) positions. Substituted groups may include, but are not limited to, halogens, cyano groups, amine groups, silyl groups, hydroxyl groups, acid groups, alkoxy groups, primary or secondary or tertiary hydrocarbon groups, or a combination of two or more groups thereof. The isocyanate-reactive hydroxy and/or amine groups may be terminal or pendant groups on the oligomeric or polymeric backbone, and in the case of secondary amine groups, may even be embedded within the backbone. Any and all of the polyahls disclosed herein may be used alone or in combination of two or more thereof.

Suitable polyols have a molecular weight of at least about 200 and at least two primary or secondary hydroxyl terminal groups per molecule, and include, but are not limited to: polyether polyols such as PTMEG, modified PTMEG, poly (tetrahydrofuran-co-methyltetrahydrofuran) ether glycol, poly(oxyethylene) glycol, poly(oxypropylene) glycol, poly (oxyethylene-oxypropylene) glycol, (ethylene oxide)-capped poly(oxypropylene) ether glycol; polyester polyols such as poly(ethylene adipate) glycol, poly(butylene adipate) glycol, poly(hexamethylene adipate) glycol, poly (ethylene propylene adipate) glycol, poly(ethylene butylene adipate) glycol, poly(hexamethylene butylene adipate) glycol, (o-phthalate-1,6-hexanediol)-based polyester polyol, poly(ethylene terephthalate)-based polyester polyol; polycaprolactone polyols such as (alkylene oxide)-initiated polycaprolactones, (ethylene glycol)-initiated polycaprolactone, (diethylene glycol)-initiated polycaprolactone, (propylene glycol)-initiated polycaprolactone, (dipropylene glycol)-initiated polycaprolactone, 1,4-butanediol-initiated polycaprolactone, trimethylolpropane-initiated polycaprolactone, (neopentyl glycol)-initiated polycaprolactone, 1,6-hexanediol-initiated polycaprolactone, PTMEG-initiated polycaprolactone; polycarbonate polyols such as poly(phthalate carbonate) glycol, poly(hexamethylene carbonate) glycol, (bisphenol A)-based polycarbonate glycols; polyhydrocarbon polyols such as polyisoprene polyol, poly(hydrogenated isoprene) polyol, hydroxy-terminated liquid isoprene rubber, polybutadiene polyol, poly(hydrogenated butadiene) polyol (like Polytail® H and Polytail® HA from Mitsubishi Kasei Corp.), poly(ethylene-co-propylene) polyol, poly(ethylene-co-butylene) polyol, poly(alkylene-co-styrene) polyol, Kraton® polyols, glycerol-based polyols, (castor oil)-based polyols; polyols converted from acid functional oligomers or polymers (or ionomers thereof derived from partial or full neutralization with organic or inorganic cations), such as dimerate or trimerate polyols of fatty acids or isostearic acid; and other polyols such as polyolefin polyols, polyamide polyols, and poly(organo)siloxane polyols.

Saturated members of the above-listed polyols (aliphatic, alicyclic, or fully hydrogenated) are preferred for use in the present invention, because they afford superior light stability when incorporated into the golf ball cover composition. Exemplary saturated polyols include, but are not limited to, PTMEG, modified PTMEG, poly(tetrahydrofuran-co-methyltetrahydrofuran) ether glycol, poly(oxyethylene) glycol, poly(oxypropylene) glycol, poly(oxyethylene-oxypropylene) glycol, (ethylene oxide)-capped poly (oxypropylene) ether glycol, poly(ethylene adipate) glycol, poly(butylene adipate) glycol, poly(hexamethylene adipate) glycol, poly(ethylene propylene adipate) glycol, poly (ethylene butylene adipate) glycol, poly(hexamethylene butylene adipate) glycol, (alkylene oxide)-initiated polycaprolactones, (ethylene glycol)-initiated polycaprolactone, (diethylene glycol)-initiated polycaprolactone, (propylene glycol)-initiated polycaprolactone, (dipropylene glycol)-initiated polycaprolactone, 1,4-butanediol-initiated polycaprolactone, trimethylolpropane-initiated polycaprolactone, (neopentyl glycol)-initiated polycaprolactone, 1,6-hexanediol-initiated polycaprolactone, PTMEG-initiated polycaprolactone, poly (hexamethylene carbonate) glycol, saturated poly (hydrogenated isoprene) polyol, saturated poly (hydrogenated butadiene) polyol, poly(ethylene-co-propylene) polyol, poly(ethylene-co-butylene) polyol, poly (alkylene-co-styrene) polyol, Kraton® polyols, saturated dimerate or trimerate polyols of fatty acids or isostearic acid, saturated polyolefin polyols, saturated polyamide polyols, saturated glycerol-based polyols, saturated (castor oil)-based polyols, and polydimethylsiloxane polyols.

Suitable polyamines preferably have a molecular weight of at least about 200 and at least two primary or secondary amine terminal groups per molecule. Because lower molecular weight amine-terminated polymers may be prone to forming solids, a high molecular weight of at least about 1,000 is more preferred. Exemplary polyamines include, but are not limited to: polyether polyamines such as polyoxyalkylene diamines, polyoxyethylene diamines, polyoxypropylene diamines, poly(oxyethylene-oxypropylene) diamines, polyoxypropylene triamine, poly(tetramethylene ether) diamines, (ethylene oxide)-capped polyoxypropylene ether diamines, poly(triethyleneglycol) diamines, poly (trimethylolpropane) triamines, polyethyleneglycol-di(p-aminobenzoate), polytetramethyleneoxide-di(p-aminobenzoate), glycerin-based triamines; and other polyamines such as polyester polyamines, polycaprolactone polyamines, polycarbonate polyamines, polyhydrocarbon polyamines, polyamines converted from acid functional oligomers or polymers or ionomers thereof, polyolefin polyamines, polyamide polyamines, and poly(organo) siloxane polyamines. Any of these polyamines may be prepared from the above-listed polyols through reductive amination of polyether polyols with ammonia and hydrogen in the presence of a catalyst, hydrogenation of cyanoethylated polyols, amination of polyol/sulfonic acid esters, reacting polyols with epichlorohydrin and a primary amine, or any other methods known to the skilled artisan.

Exemplary polyamines converted from the polyols above include, without limitation, polytetramethylene ether diamine, modified polytetramethylene ether diamine, poly (tetrahydrofuran-co-methyltetrahydrofuran) ether diamine, poly(oxyethylene) diamine, poly(oxypropylene) ether diamine or triamine, poly(oxyethylene-oxypropylene) diamine, (ethylene oxide)-capped poly(oxypropylene) diamine, poly(ethylene adipate) diamine, poly(butylene adipate) diamine, poly(hexamethylene adipate) diamine, poly(ethylene propylene adipate) diamine, poly(ethylene butylene adipate) diamine, poly(hexamethylene butylene adipate) diamine, (o-phthalate-1,6-hexanediol)-based polyester polyamine, poly(ethylene terephthalate)-based polyester polyamine, (alkylene oxide)-initiated polycaprolactone polyamine, (ethylene glycol)-initiated polycaprolactone polyamine, (diethylene glycol)-initiated polycaprolactone polyamine, (propylene glycol)-initiated polycaprolactone polyamine, (dipropylene glycol)-initiated polycaprolactone polyamine, 1,4-butanediol-initiated polycaprolactone polyamine, trimethylolpropane-initiated polycaprolactone polyamine, (neopentyl glycol)-initiated polycaprolactone polyamine, 1,6-hexanediol-initiated polycaprolactone polyamine, (polytetramethylene ether glycol)-initiated polycaprolactone polyamine, poly(phthalate carbonate) diamine, poly(hexamethylene carbonate) diamine, (bisphenol A)-based polycarbonate diamines, polyisoprene polyamine, poly(hydrogenated isoprene) polyamine, amine-terminated liquid isoprene rubber, polybutadiene polyamine, poly (hydrogenated butadiene) polyamine, poly(ethylene-co-propylene) polyamine, poly(ethylene-co-butylene) polyamine, poly(alkylene-co-styrene) polyamine, glycerol-based polyamines, (castor oil)-based polyamines, dimerate or trimerate polyamines of fatty acids or isostearic acid, or acid functional polyamines. Saturated (aliphatic, alicyclic, or fully hydrogenated) polyamines are preferred for use in golf balls to provide superior light stability, and include polyoxyalkylene diamines, polyoxyethylene diamines, polyoxypropylene diamines, poly(oxyethylene-oxypropylene) diamines, polyoxypropylene triamines, poly(tetramethylene ether) diamines, (ethylene oxide)-capped polyoxypropylene ether diamines, poly(triethyleneglycol) diamines, poly (trimethylolpropane) triamines, saturated glycerin-based triamines, saturated polyester polyamines, saturated polycaprolactone polyamines, saturated polycarbonate polyamines, saturated polyhydrocarbon polyamines, saturated acid functional polyamines, saturated polyolefin polyamines, saturated polyamide polyamines, and polydimethylsiloxane diamines.

Any of the polyahls disclosed herein, particularly those having a molecular weight of less than about 10,000, preferably less than about 5,000, may optionally be used as curing agents for chain-extension and/or crosslink. In particular, the curing agents react with the prepolymers to afford the desired golf ball compositions. Other suitable curing agents for the invention include polyahls and epoxies, preferably hydroxy curatives, amine curatives, and aminoalcohol curatives. Suitable hydroxy curatives have a molecular weight of about 50 to about 5,000, and include, but are not limited to, unsaturated diols such as 1,3-bis(2-hydroxyethoxy) benzene, 1,3-bis[2-(2-hydroxyethoxy) ethoxy] benzene, N,N-bis(β-hydroxypropyl)aniline, 1,3-bis {2-[2-(2-hydroxyethoxy)ethoxy]ethoxy} benzene, hydroquinone-di(β-hydroxyethyl)ether, resorcinol-di(β-hydroxyethyl)ether; saturated diols such as ethylene glycol, diethylene glycol, polyethylene glycol, propylene glycol, dipropylene glycol, polypropylene glycol, 2-methyl-1,3-propanediol, 1,2-, 1,3-, 1,4-, or 2,3-butanediols, 2-methyl-1,4-butanediol, 2,3-dimethyl-2,3-butanediol, 1,5-pentanediol, 1,6-hexanediol, dimethylolcyclohexane, 1,3-bis(2-hydroxyethoxy)cyclohexane, 1,3-bis[2-(2- hydroxyethoxy)ethoxy]cyclohexane, 1,3-bis {2-[2-(2-hydroxyethoxy)ethoxy]ethoxy}cyclohexane; unsaturated triols such as castor oil (i.e., triricinoleoyl glycerol); saturated triols such as 1,2,4-butanetriol, 1,2,6-hexanetriol, trimethylolethane (i.e., 1,1,1-tri(hydroxymethyl)ethane), trimethylolpropane (i.e., 2,2-di(hydroxymethyl)-1-butanol), triethanolamine, triisopropanolamine; unsaturated tetraols such as 2,4,6-tris(N-methyl-N-hydroxymethyl-aminomethyl)phenol; saturated tetraols such as pentaerythritol (i.e., tetramethylolmethane), tetrahydroxypropylene ethylenediamine (i.e., N,N,N',N'-tetrakis(2-hydroxypropyl)-ethylenediamine); and other monomeric polyols such as mannitol (i.e., 1,2,3,4,5,6-hexanehexol) and sorbitol (an enantiomer of mannitol) (both saturated).

Suitable amine curatives have a molecular weight of about 50 to about 5,000, and include, but are not limited to, unsaturated diamines such as m-phenylenediamine, p-phenylenediamine, 1,2- or 1,4-bis(sec-butylamino)-benzene, 3,5-diethyl-(2, 4 or 2,6)-toluenediamine, 3,5-dimethylthio-(2, 4 or 2,6)-toluenediamine, 3,5-diethylthio-(2, 4 or 2,6)-toluenediamine, 4,4'-diamino-diphenylmethane (i.e., 4,4'-methylene-dianiline or "MDA"), 3,3'-dimethyl-4,4'-diamino-diphenylmethane, 3,3'-diethyl-5,5'-dimethyl-4,4'-diamino-diphenylmethane (i.e., 4,4'-methylene-bis(2-ethyl-6-methyl-benzeneamine)), 3,3'-dichloro-4,4'-diamino-diphenylmethane (i.e., 4,4'-methylene-bis(2-chloroaniline) or "MOCA"), 3,3'-diethyl-5,5'-dichloro-4,4'-diamino-diphenylmethane, 3,3',5,5'-tetraethyl-4,4'-diamino-diphenylmethane (i.e., 4,4'-methylene-bis(2,6-diethylaniline) or "MDEA"), 2,2'-dichloro-3,3',5,5'-tetraethyl-4,4'-diamino-diphenylmethane (i.e., 4,4'-methylene-bis(3-chloro-2,6-diethyleneaniline) or "MCDEA"), 3,3'-dichloro-4,4'-diamino-diphenylmethane, 4,4'-methylene-bis(2,3-dichloroaniline) (i.e., 2,2',3,3'-tetrachloro-4,4'-diamino-diphenylmethane or "MDCA"), 4,4'-bis(sec-butylamino)-diphenylmethane, N,N'-dialkylamino-diphenylmethane, trimethyleneglycol-di(p-aminobenzoate), polyethyleneglycol-di(p-aminobenzoate), polytetramethyleneglycol-di(p-aminobenzoate); saturated diamines such as ethylene diamine, 1,3-propylene diamine, 2-methyl-pentamethylene diamine, hexamethylene diamine, 2,2,4- and 2,4,4-trimethyl-1,6-hexane diamine, imino-bis (propylamine), imido-bis(propylamine), methylimino-bis (propylamine) (i.e., N-(3-aminopropyl)-N-methyl-1,3-propanediamine), 1,4-bis(3-aminopropoxy)butane (i.e., 3,3'-[1,4-butanediylbis-(oxy)bis]-1-propanamine), diethyleneglycol-bis(propylamine) (i.e., diethyleneglycol-di(aminopropyl)ether), 4,7,10-trioxatridecane-1,13-diamine, polyoxyethylene diamines, polyoxypropylene diamines, poly(oxyethylene-oxypropylene) diamines, (ethylene oxide)-capped polyoxypropylene ether diamines, polytetramethylene ether diamines, 1-methyl-2,6-diamino-cyclohexane, 1,4-diamino-cyclohexane, 1,3- or 1,4-bis (methylamino)-cyclohexane, isophorone diamine, 1,2- or 1,4-bis(sec-butylamino)-cyclohexane, N,N'-diisopropyl-isophorone diamine, 4,4'-diamino-dicyclohexylmethane, 3,3'-dimethyl-4,4'-diamino-dicyclohexylmethane, 3,3'-dichloro-4,4'-diamino-dicyclohexylmethane, N,N'-dialkylamino-dicyclohexylmethane, 3,3'-diethyl-5,5'-dimethyl-4,4'-diamino-dicyclohexylmethane, 3,3'-diethyl-5,5'-dichloro-4,4'-diamino-dicyclohexylmethane, 3,3',5,5'-tetraethyl-4,4'-diamino-dicyclohexylmethane (i.e., 4,4'-methylene-bis(2,6-diethylaminocyclohexane)), 2,2'-dichloro-3,3',5,5'-tetraethyl-4,4'-diamino-dicyclohexylmethane, 3,3'-dichloro-4,4'-diamino-dicyclohexylmethane, 3,3'-dichloro-2,2',6,6'-tetraethyl-4,4'-diamino-dicyclohexylmethane, 2,2',3,3'-tetrachloro-4,4'-diamino-dicyclohexylmethane, 4,4'-bis(sec-butylamino)-dicyclohexylmethane; triamines such as diethylene triamine, dipropylene triamine, (propylene oxide)-based triamines (i.e., polyoxypropylene triamines), trimethylolpropane-based triamines, glycerin-based triamines, N-(2-aminoethyl)-1,3-propylenediamine (i.e., $N_3$-amine) (all saturated); tetramines such as triethylene tetramine, N,N'-bis(3-aminopropyl)ethylenediamine (i.e., $N_4$-amine) (both saturated); and other polyamines such as tetraethylene pentamine (also saturated).

Suitable aminoalcohol curatives may be monomeric, oligomeric, or polymeric, having at least one free reactive hydroxy group and at least one free reactive amine group. The hydroxy and amine groups may be terminal or pendant groups on the oligomeric or polymeric backbone, and in the case of secondary amine groups, may even be embedded within the backbone. Non-limiting examples of monomeric amino alcohol curatives include monoethanolamine (saturated), monoisopropanolamine (saturated), diethanolamine (saturated), diisopropanolamine (saturated), and 2-propanol-1,1'-phenylaminobis (unsaturated).

For best light stability, all reactants in the cover compositions are preferably saturated. Most preferred saturated curatives are 4,4'-bis-(sec-butylamino)-dicyclohexylmethane, 2,3-dimethyl-2,3-butanediol, 2-methyl-1,3-propanediol, 2-methyl-1,4-butanediol, 1,4-butanediol, and 1,4-cyclohexyldimethylol. In one embodiment, a hindered secondary diamine having a high level of stearic hindrance, such as 4,4'-bis(sec-butylamino)-dicyclohexylmethane (Clearlink® 1000), N,N'-di (ethylmaleate-amino)-dicyclohexylmethane (i.e., 4,4'-bis (diethylsuccinato-amino)-dicyclohexylmethane, Desmophen® NH 1420), N,N'-di(ethylmaleate-amino)-dimethyl-dicyclohexylmethane (i.e., 3,3'-dimethyl-4,4'-bis (diethylsuccinato-amino)-dicyclohexylmethane, Desmophen® NH 1520), N,N'-diethylmaleate-2-methyl-pentamethylene diamine (Desmophen® NH 1220), or N,N'-diisopropyl-isophorone diamine, may be used alone or in combination of other curing agent(s) to beneficially slow down the curing process. Clearlink® curatives are available from UOP LLC of Des Plaines, Ill., and Desmophen® NH polyaspartic esters are available from Bayer Corporation of Pittsburgh, Pa. In another embodiment, a curing agent having a relatively low freezing point may be used as a freezing point depressant. Such dual functional curing agents include, without limitation, 2-methyl-1,3-propanediol and 2-methyl-1,4-butanediol. Other useful freezing point depressants are disclosed in co-pending U.S. patent application Ser. No. 10/339,603, which is incorporated herein by reference in its entirety.

As described above, the α,ω-polyacrylate telechelics of the present invention may be incorporated into a prepolymer, used as a curing agent, or both, in the elastomeric reaction product that forms the golf ball cover layer. In particular, the α,ω-polyacrylate telechelics are incorporated into one or more soft segments of the reaction product, and are substantially absent in any hard segments of the reaction product. To form the prepolymer, the α,ω-polyacrylate telechelics, alone or in a blend with other polyahls disclosed herein, may react with one or more isocyanates at an equivalent ratio of about 0.01:1 to about 1:1. When the α,ω-polyacrylate telechelics is used alone, the equivalent ratio is preferably about 0.3:1 to about 0.6:1, more preferably about 0.5:1. The weight ratio of the α,ω-polyacrylate telechelic to any other polyahls in a blend may be about 1:20 to about 20:1. The α,ω-polyacrylate telechelics used in the prepolymer may have a relatively high molecular weight, preferably at least about 500, more preferably from about 1,000 to about 5,000. The above-listed curing agents, used alone or in combination of two or more thereof, may then be used to cure the prepolymer into a thermoplastic or thermoset polyurethane, polyurea, or polyurea/polyurethane hybrid. An equivalent ratio of the prepolymer to the curing agent is preferably about 1:0.6 to about 1:1.5, more preferably about 1:0.8 to about 1:1.2, and most preferably about 1:0.95.

When used as a curing agent, the α,ω-polyacrylate telechelics may have a lower molecular weight than those suitable for the prepolymer, preferably less than about 5,000, more preferably about 200 to about 3,000. The α,ω-polyacrylate telechelic curative may be used alone or in combination with other curatives disclosed above, and react with any prepolymers at an equivalent ratio of 0.6:1 to about 1.5 to 1. Preferably, the α,ω-polyacrylate telechelic constitutes at least about 1 weight percent of the total curative mixture, more preferably about 5 weight percent to about 100 weight percent. The prepolymers include those disclosed herein, such as the α,ω-polyacrylate telechelics-based prepolymers, and any prepolymers formed from any combinations of the polyahls and the isocyanates listed above. Such prepolymers may have only urethane bonds (polyurethane prepolymers), only urea bonds (polyurea prepolymer), or both (polyurethane/polyurea hybrid prepolymer).

A variety of additives can optionally be incorporated into the cover layer compositions of the present invention. For example, a catalyst may be employed to promote the reaction between the curing agent and the prepolymer. Suitable catalysts include, but are not limited to, zinc catalysts such as zinc octoate; cobalt (II) octoate, bismuth catalysts; tin catalysts, such as dibutyltin dilaurate (Dabco® T-12), dibutyltin diacetate (Dabco® T-1), dibutyltin maleate, tin (II) ethylhexoate, tin (II) laurate, tin (II) octoate, tin (II) chloride, tin (IV) chloride, dibutyltin dimethoxide (Fascat® 4211), dibutyltin dibutoxide (Fascat® 4214), dimethyl-bis[(1-oxoneodecyl)oxy] stannane (Formez® UL-28), di(n-octyl)tin bis(isooctyl-mercaptoacetate) (Formez® UL-29), 1,3-diacetoxytetrabutyl-stannoxane, and 2-ethylhexyl-titanate; amine catalysts, such as triethylenediamine (Dabco® 33-LV), triethylamine, tributylamine, or N-methylmorpholine; organic acids, such as acetic acid, adipic acid, azelaic acid, octanoic acid, or oleic acid; delayed heated-activated catalysts, such as phenol-blocked 1,8-diazabicyclo(5,4,0)undecene-7 (Polycat™ SA-1/10), Polycat™ SA-102, or Polycat™ 8154.

These catalysts may be used alone or in combination of two or more thereof, and are added in an amount sufficient to catalyze the polymerization reaction, preferably about 0.001 weight percent to about 5 weight percent based on the total weight of the formulation, more preferably about 0.005 weight percent to about 3 weight percent. Unconventionally high levels of catalysts allow lowered processing temperature and mixing speed while retain comparable cure. The tin catalyst amount used is preferably about 0.05 weight percent to about 1 weight percent, more preferably about 0.25 weight percent to about 0.6 weight percent.

In one embodiment, the cover layer composition further comprises at least one UV absorber and/or light stabilizer, preferably hindered amine light stabilizer, to prevent significant yellowing from unsaturated components contained therein, and to prevent cover surface fractures due to photodegradation. These UV absorbers and light stabilizers are particularly useful in visible cover layers, such as the outer cover layer, or any other internal layer when the layer(s) disposed about it are translucent or transparent. Suitable UV absorbers include Uvinul® DS49 (disodium 2,2'-dihydroxy-4,4'-dimethyoxy-5,5'-disulfobenzophenone) and Uvinul® DS50 (2,2',4,4'-tetrahydroxy-benzophenone) by BASF Corporation; Tinuvin® 328 (2-(2'-hydroxy-3',5'-di(t-amylphenyl)benzotriazole), Tinuvin® 571 (2-(2H-benzotriazol-2-yl)-6-dodecyl-4-methylphenol), Tinuvin® P (2-(2-hydroxy-5-methylphenyl)benzotriazole), and CGL 1545 (experimental triazine derivative) by Ciba Specialty Chemicals Corporation; Sanduvor® PR-25 (dimethyl-4-methoxy-benzylidenemalonate) by Clariant Corporation; Cyasorb® UV-2337 (2-(2'-hydroxy-3',5'-di(t-amylphenyl)benzotriazole), Cyasorb® UV-1164 (2-(4,6-bis(2,4-dimethylphenyl)-1,3,5-triazin-2-yl)-5-octyloxyphenol), and Cyasorb® UV-3638 (2,2'-(1,4-phenylene)-bis(4-3,1-benzoxazin-4-one)) by Cytec Industries; Quercetin® (3,3', 4',5,7-pentahydroxy flavone) by EM Industries; UV-Chek® AM-300 (2-hydroxy-4-n-octyloxy-benzophenone) and UV-Chek® AM-340 (2,4-di(t-butylphenyl)-3,5-di(t-butyl)-4-hydroxybenzoate) by Ferro Corporation; Maxgard® DPA-8 (2-ethylhexyl-2-cyano-3,3-diphenylacrylate) by Garrison Industries; Givsorb® 2 (propanedione), Givsorb® 13, Givsorb® 14, and Givsorb® 15 by Givaudan-Roure Corporation; Norbloc® 6000 (2-(2'-hydroxy-5'-(2-hydroxyethyl)benzotriazole) and Norbloc® 7966 (2-(2'-hydroxy-5'-methacryloxyethylphenyl)-2H-benzotriazole) by Jessen Pharmaceuticals. Suitable light stabilizers include, but are not limited to, Tinuvin® 622 LD (dimethyl succinate polymer with 4-hydroxy-2,2,6,6-tetramethyl-1-piperidine ethanol) and Tinuvin® 765 (bis(1,2,2,6,6-pentamethyl-4-piperidinyl)sebacate) by Ciba Specialty Chemicals Corporation; Sanduvor® 3070 (hindered amine) by Clariant Corporation; Cyasorb® UV-3581 (3-dodecyl-1-(2,2,6,6-tetramethyl-4-piperidylpyrrolidin-2,5-dione) by Cytec Industries. For aromatic and unsaturated formulations, the preferred UV absorber is Tinuvin® 328, and the preferred hindered amine light stabilizer is Tinuvin® 765. A preferred light stabilizer for saturated formulations is Tinuvin® 292. In addition, Tinuvin® 213 and 770, and antioxidants to prevent degradation of the cover composition, such as Irganox® 1010 (tetrakis(3,5-di(t-butyl-hydroxyhydrocinnamate))methane) and Irganox® 1135 ($C_{7-9}$-branched alkyl ester of 3,5-di(t-butyl-4-hydroxyhydrocinnamic acid) by Ciba Specialty Chemicals Corporation and Sandostab® P-EPQ (aryl phosphonite) by Clariant Corporation, are also applicable.

Other additive for the cover layer compositions of the present invention include, but are not limited to, accelerators to speed up the polymerization reaction, fillers to adjust density and/or modulus of the layer, viscosity modifiers, release agents, plasticizers, compatibilizing agents, coupling agents, dispersing agents, colorants including pigments and dyes, optical brighteners, surfactants, lubricants, stabilizers, metals, processing aids or oils to affect rheological and mixing properties, blowing agents, and any other modifying agents known to one of ordinary skill in the art. Pigments may be fluorescent, autofluorescent, luminescent, or chemoluminescent, and include white pigments such as titanium oxide and zinc oxide. These additives may be blended into the cover layer composition in amounts sufficient to achieve their specific purposes and desired effects.

As used herein, the term "filler" refers to any compound or composition that can be used to vary certain properties of selected portions of the golf ball, including density or specific gravity, flexural modulus, tensile modulus, strength, moment of inertia, hardness, abrasion resistance, weatherability, volume, weight, etc. The fillers are preferably in the forms of nano-scale or micro-scale powders, fibers, filaments, flakes, whiskers, wires, tubes, or particulates for homogenous dispersion. Suitable fillers for golf balls may be solid or hollow, and include, for example, metal (or metal alloy) powder, metal oxide and salts, ceramics, particulates, carbonaceous materials, polymeric materials, glass microspheres, and the like or blends thereof. Non-limiting examples of metal (or metal alloy) powders include, but are not limited to, bismuth, brass, bronze, cobalt, copper, inconel, iron, molybdenum, nickel, stainless steel, titanium, aluminum, tungsten, beryllium, zinc, magnesium, manganese, and tin. Non-limiting examples of metal oxides and salts include, but are not limited to, zinc oxide, iron oxide, aluminum oxide, titanium dioxide, magnesium oxide, zirconium oxide, tungsten trioxide, zirconium oxide, tungsten carbide, tungsten oxide, tin oxide, zinc sulfide, zinc sulfate, zinc carbonate, barium sulfate, barium carbonate, calcium carbonate, calcium metasilicate, magnesium carbonate, and silicates. Non-limiting examples of carbonaceous materials include graphite and carbon black. Examples of other useful fillers include precipitated hydrated silica, boron, clay, talc, glass fibers, aramid fibers, mica, diatomaceous earth, regrind (typically recycled core material mixed and ground to 30 mesh particle size). Examples of polymeric materials include, but are not limited to, hollow spheres or microspheres of chemically or physically foamed thermoplastic or thermosetting polymers, such as epoxies, urethanes, polyesters, nucleated reaction injection molded polyurethanes or polyureas.

Other materials suitable for golf ball cover, intermediate, or core layers may be blended with the polyurethane, polyurea, or hybrid compositions of the present invention, by about 1 weight percent to about 95 weight percent of the composition. Non-limiting examples of such materials include:

1) Non-ionomeric acid polymers, such as copolymers E/Y of an olefin E having 2 to 8 carbon atoms and a carboxylic acid Y having 3 to 8 carbon atoms, or terpolymers E/X/Y having an additional softening comonomer X. The olefin E is preferably ethylene, and the acid Y includes acrylic, methacrylic, crotonic, maleic, fumaric, or itaconic acid. The comonomer X includes vinyl esters of aliphatic carboxylic acids having 2 to 10 carbon atoms, and alkyl ethers, alkyl acrylates, or alkyl alkylacrylates of alkyl groups having 1 to 10 carbon atoms. Depending on the acid content by weight, the polymer may be referred to as low acid (about 2% to less than 10%), medium acid (about 10% to less than 16%), and high acid (about 16% to about 50%). The comonomer, when present, may be in an amount of about 2% to about 40% by weight of the acid polymer. Preferred non-ionomeric acid polymers include Nucrel® from E. I. DuPont de Nemours & Company and Escor® from ExxonMobil.

2) Anionic and cationic ionomers such as the acid polymers above partially or fully neutralized with organic or inorganic cations, such as zinc, sodium, lithium, magnesium, potassium, calcium, manganese, nickel, ammonium (primary, secondary, tertiary), or the like. The extent of neutralization ranges from about 0% to about 100% or more, preferably at least about 50%, more preferably at least about 70%. Preferred acid ionomers include Surlyn® and Entira® from E. I. DuPont de Nemours & Company, and Iotek® from ExxonMobil.

3) Thermoplastic or thermoset (vulcanized) synthetic or natural rubbers, including polyolefins and copolymers or blends thereof, such as balata, polyethylene, polypropylene, polybutylene, isoprene rubber, ethylene-propylene rubber, ethylene-butylene rubber, ethylene-propylene-(non-conjugated diene) terpolymers; polystyrenes and copolymers thereof, such as styrene-butadiene copolymers, poly(styrene-co-maleic anhydride), acrylonitrile-butylene-styrene copolymers, poly(styrene sulfonate); and homopolymers or copolymers produced using single-site catalyst such as metallocene (grafted or non-grafted).

4) Polyphenylene oxide resins, polyarylene ethers, or blends of polyphenylene oxide with high impact polystyrene such as Noryl® from General Electric Company.

5) Aliphatic and/or aromatic thermoplastics, including polyesters, such as ethylene methylacrylate, ethylene ethylacrylate, ethylene vinyl acetate, poly(ethylene terephthalate), poly(butylene terephthalate), poly(propylene terephthalate), poly(trimethylene terephthalate), modified poly(ethylene terephthalate)/glycol, poly(ethylene naphthalate), cellulose esters, Hytrel® from E. I. DuPont de Nemours & Company, and Lomod® from General Electric Company; polycarbonates; polyacetals; polyimides; polyetherketones; polyamideimides; thermoplastic block copolymers (Kraton® rubbers from Shell Chemical); co-polyetheramides (Pebax® from AtoFina); and elastomers in general.

6) Vinyl resins such as polyvinyl alcohols, polyvinyl alcohol copolymers, polyvinyl chloride, block copolymers of alkenyl aromatics with vinyl aromatics and polyesteramides, copolymers of vinyl chloride with vinyl acetate, acrylic esters or vinylidene chloride.

7) Polyamides such as poly(hexamethylene adipamide) and others prepared from diamines, fatty acids, dibasic acids, and amino acids (poly(caprolactam)), and blends of polyamides with Surlyn®, ethylene homopolymers or copolymers or terpolymers, etc.

8) Acrylic resins and blends of these resins with polyvinyl chloride or other elastomers.

9) Blends and alloys, including blends of polycarbonate and acrylonitrile-butylene-styrene, blends of polycarbonate and polyurethane, blends of polyvinyl chloride with acrylonitrile-butadiene-styrene or ethylene vinyl acetate or other elastomers, blends of thermoplastic rubbers with polyethylene or polypropylene.

Preferably, a thermoplastic polyurethane, polyurea, or polyurethane/polyurea hybrid of the present invention is blended with one or more thermoplastic materials listed above to form a thermoplastic composition for a golf ball portion.

The cover layer for the golf ball of the present invention may be formed from a thermoplastic or thermoset polyurethane or polyurea, including the ones comprising the $\alpha,\omega$-polyacrylate telechelics as disclosed herein, but not limited thereto. Preferably the polyurethane or polyurea is saturated. The cover layer may have a WVTR of less than about 2 g/(m²×day), a modulus of about 1,000 to about 100,000 psi, and a material hardness of no greater than about 90 Shore D. In one embodiment, the cover layer has a Shore D hardness of about 30 to about 70 and a modulus of about 10,000 psi to about 80,000 psi. The cover layer may have any thickness of less than about 0.2 inches, preferably less than about 0.05 inches, more preferably about 0.01 inches to about 0.04 inches. Alternatively, the cover layer thickness is about 0.05 inches to about 0.1 inches. The cover layer preferably has an inner diameter of about 0.5 inches to about 1.7 inches, and an outer diameter of about 1 inch to about 1.8 inches.

Any method known to one of ordinary skill in the art may be used to produce the cover layer of the present invention. One-shot method involving concurrent mixing of the isocyanate, the $\alpha,\omega$-polyacrylate telechelics, and the curing agent is feasible, but the resulting mixture is non-homogenous and difficult to control. The prepolymer method described above is most preferred, because it affords a more homogeneous mixture resulting in a more consistent polymer composition. The prepolymer may be reacted with a diol or a secondary diamine to form a thermoplastic material, or reacted with a triol, tetraol, primary diamine, triamine, or tetramine to form a thermoset material. Other methods suitable for forming the layers include casting, compression molding, reaction injection molding ("RIM"), liquid injection molding ("LIM"), injection-compression molding, pre-reacting the components to form an injection moldable thermoplastic material and then injection molding, and combinations thereof, such as RIM/compression molding, injection/compression molding, progressive compression molding, and the like. Thermoplastic formulations may be processed using any number of compression or injection molding techniques. Thermoset formulations may be castable, reaction injection moldable, sprayable, or applied in a laminate form or by any techniques known in the art. Castable reactive liquid materials can provide very thin layers such as outer cover layers that are desirable on golf balls.

Other techniques for forming the cover layers of the present invention include spraying, dipping, spin coating, or flow coating. These techniques are particularly preferred when the compositions of the present invention are used to form thin layers of preferably less than about 0.02 inches, more preferably less than about 0.01 inches. Besides their use in the cover layers, these thin layers may also be used as coating layers about the cover, or as any intermediate layers disposed between or within the core and the cover, such as outer core layers and/or barrier layers (against permeation of water vapor and/or gaseous substance such as oxygen gas) about the core. Other compositions suitable for such coating layers and barrier layers, besides those discussed above, also include, but are not limited to, self-emulsifiable polyurethane resins, polyurethane dispersions, polyurethane/polymer hybrid dispersions, radiation-curable urethane acrylates, and polyurethane-modified polyacrylates. Detailed descriptions of these compositions are found in U.S. Patent Application Publication Nos. US 2003/0004264, US 2002/0193507, US 2001/0031369, and in U.S. Pat. Nos. 6,001,915 and 6,001,424. The entire disclosures of these applications and patents are incorporated herein by reference thereto.

The core of the golf balls in the present invention may be solid, fluid-filled, gel-filled, or gas-filled. The solid core can be made from any suitable core materials including thermoset plastics, such as natural rubber, polybutadiene, polyisoprene, styrene-butadiene or styrene-propylene-diene rubber, and thermoplastics such as ionomer resins, polyamides, polyesters, or a thermoplastic elastomer. Suitable thermoplastic elastomers include Pebax® from AtoFina Chemicals Inc., Hytrel® from E.I. Du Pont de Nemours and Company, thermoplastic urethane from various manufacturers, and Kraton® from Shell Chemical Company. The core materials can also be formed from a castable material. Suitable castable materials include polyurethanes, polyureas, epoxies, silicones, etc. Additionally, suitable core materials may also include a RIM polyurethane or polyurea, including the nucleated versions where nitrogen gas is whipped into the reaction mixture prior to injection into a closed mold to form the layer.

Preferred compositions for solid cores include a base rubber, a crosslinking agent, and an initiator. The base rubber typically includes natural or synthetic rubbers. A preferred base rubber is 1,4-polybutadiene having a cis-bond of at least about 40%, a Mooney viscosity of at least about 30, a molecular weight of at least about 150,000, and a polydispersity of less than about 4. Blends of two or more such polybutadienes are desirable for the solid cores. In one embodiment, a cobalt or nickel catalyzed polybutadiene having a Mooney viscosity of from about 50 to about 150 is mixed with a neodymium catalyzed polybutadiene having a Mooney viscosity of from about 30 to about 100. The weight ratio between the two polybutadienes may range between about 5:95 and 95:5. The polybutadiene can also be mixed with other elastomers known in the art, such as natural rubber, polyisoprene rubber and/or styrene-butadiene rubber, in order to modify the properties of the core.

Suitable cross-linking agents for the polybutadiene-based solid cores include metal salts of unsaturated fatty acid having 3 to 8 carbon atoms, such as diacrylate, dimethacrylate, and monomethacrylate, wherein the metal can be magnesium, calcium, zinc, aluminum, sodium, lithium or nickel. Preferred acrylates include zinc diacrylate, zinc dimethacrylate, and blends thereof. Zinc diacrylate is preferred because it provides golf balls with a high initial velocity, but the present invention is not limited thereto. The crosslinking agent may be present in any amount. In one embodiment, the amount of the crosslinking agent used is less than about 25 parts per hundred parts of the base rubber ("phr"). In another embodiment, the amount of the crosslinking agent is greater than about 40 phr. In conventional solid cores, the crosslinking agent amount is typically greater than about 10 phr, preferably about 20 phr to about 40 phr.

The peroxide initiators used to promote the cross-linking reaction in the core are well known in the art, and can be any known peroxides or blends thereof that decompose during the cure cycle. Suitable peroxide initiators include organic peroxide compounds, such as dicumyl peroxide, 1,1-di(t-butylperoxy) 3,3,5-trimethyl cyclohexane, $\alpha,\alpha$-bis (t-butylperoxy) diisopropylbenzene, 2,5-dimethyl-2,5 di(t-butylperoxy) hexane, di-t-butyl peroxide, and blends thereof. In their pure forms, the initiators are present in an amount of at least about 0.25 pph of the base polymer, preferably between about 0.5 pph and about 2.5 pph. It is understood to one skilled in the art to adjust the amount of the initiators according to their activity and concentration.

In polybutadiene-based solid cores of the present invention, it is preferred to blend in a plasticizer, more preferably a halogenated organosulfur compound such as a halogenated thiophenol or a metal salt thereof, to further enhance the resiliency of the core. The halogenated thiophenol, preferably pentachlorothiophenol ("PCTP") or ZnPCTP, function in part as a cis-to-trans catalyst that convert cis-1,4 bonds in the polybutadiene to trans-1,4 bonds. The utilization of halogenated organosulfur compounds like PCTP and ZnPCTP in golf balls to produce soft and fast cores is disclosed in co-pending U.S. Patent Application Publication No. US 2003/0064826, which is incorporated by reference herein in its entirety. The halogenated thiophenol is present in an amount of at least about 0.1 phr of the base rubber, preferably about 0.1 phr to about 2 phr; alternatively the amount of halogenated organosulfur compound used is at least about 2 phr, preferably about 2.3 phr to about 5 phr.

The solid core may also include fillers to adjust hardness, strength, modulus, weight, density and/or specific gravity of the core. Suitable fillers include metal or alloy powders, metal oxides and salts, ceramics, particulate, carbonaceous materials, polymeric materials, glass microspheres, and the like or blends thereof. These fillers may be hollow, solid, filled, unfilled, surface treated, or non-surface treated. Specific fillers for the core include tungsten powder, tungsten carbide, zinc oxide, tin oxide, tungsten oxide, barium sulfate, zinc sulfate, barium carbonate, calcium carbonate, zinc carbonate, an array of silica and clay, regrind (recycled core material typically ground to about 30 mesh particle), and high-Mooney-viscosity rubber regrind.

Other optional additives for the golf ball core are well known in the art, and may be blended into the core in amounts sufficient to achieve their specific purposes and desired effects. Such additives include antioxidants to prevent the breakdown of the base polymer, accelerators to speed up the polymerization reaction, processing aids or oils to affect rheological and mixing properties, foaming agents, cis-to-trans catalysts, adhesives, coupling agents, stable free radicals, radical scavengers, scorch retarders, and blends thereof.

The core of the golf ball of the present invention has a diameter of at least about 0.5 inches. In one embodiment, the core diameter is at least about 1 inch, more preferably from about 1.5 inches to about 1.65 inches, and most preferably from about 1.55 inches to about 1.6 inches. In another embodiment, the core comprises a center and one or more outer core layers. The center has a diameter of about 0.5 inches to about 1.5 inches, preferably about 0.8 inches to about 1.2 inches, and each of the outer core layers has a thickness of about 0.01 inches to about 0.5 inches, preferably about 0.1 inches to about 0.32 inches. The core may have a compression of from about 20 to about 120, more preferably from about 30 to about 100, and most preferably from about 40 to about 80. Alternatively, the core may be very soft, with a compression of less than about 20. The core should also be highly resilient, having a COR of preferably greater than about 0.75, more preferably greater than about 0.78, and most preferably greater than about 0.8. Conventional methods and techniques may be used to form the solid cores from the base compositions disclosed herein.

An optional intermediate layer may be disposed between the core and the cover. The intermediate layer may also be referred to as the outer core layer or the inner cover layer, and may be a continuous layer, a discontinuous layer, a wound layer, a molded layer, a lattice network layer, a web or net, an adhesion or coupling layer, a barrier layer, a layer of uniformed or non-uniformed thickness, a layer having a plurality of discrete elements such as islands or protrusions, a solid layer, a metallic layer, a liquid-filled layer, a gas-filled layer, or a foamed layer. The intermediate layer may be formed from non-ionomeric acid polymers or ionomeric derivatives thereof with 1% to 100% neutralization or more (such as Surlyn® and Entira®), polyamides, polyolefins, polyurethanes, polyureas, epoxies, polyethers, polyesters, polyetheresters such as Hytrel® from DuPont, polyetheramides such as Pebax® from AtoFina, nylons, metallocene-catalyzed polymers, styrenic block copolymers such as Kraton® from Shell Chemicals, acrylonitrile-butadiene-styrene copolymers ("ABS"), polyvinyl chlorides, polyvinyl alcohol copolymers, polycarbonates, polyesteramides, polyamides, polyimides, polyetherketones, polyamideimides, silicones, metal salts of fatty acids, and combinations thereof, such as blends of polycarbonate and acrylonitrile-butadiene-styrene, and blends of polycarbonate and polyurethane.

The intermediate layer may incorporate a modulus-enhancing filler or a density-modifying filler to attain preferred physical and mechanical properties. The composition of the intermediate layer may have a modulus of about 2,000 psi to about 150,000 psi, a material hardness of about 60 Shore C to about 80 Shore D, and a thickness of about 0.005 inches to about 0.6 inch. The composition of the intermediate layer may be applied as a liquid, powder, dispersion, lacquer, paste, gel, melt, or solid half shells. The intermediate layer may be formed around the core or onto the inside of the cover by sheet stock or vacuum shrink-wrapping, compression molding, injection molding, vacuum deposition, RIM, lamination, casting, spraying, dipping, powder coating, or any other deposition means. Preferably, a combination of these methods is used, such as injection/compression molding, RIM/compression molding, preform/compression molding, injection molding/grinding, injection/progressive compression molding, co-injection molding, or simplified casting of a single block material.

The golf ball as described above preferably has a COR of greater than about 0.78; a compression of less than about 110, more preferably less than about 100, and most preferably about 50 to about 90; a moment of inertia of less than about 84 g·cm², and a deflection at 100 kg of greater than about 1.5 mm. The golf ball preferably has an overall diameter of at least about 1.68 inches, more preferably about 1.68 inches to about 1.8 inches. At least 60% of the outermost surface of the golf ball is covered by about 250 to about 450 dimples of equal or different shapes and sizes. Preferred dimple patterns and lift and drag characteristics of the golf ball of the present invention are disclosed in co-pending U.S. Patent Application Publication Nos. US 2003/0114255 and Ser. No. 10/096,852, respectively, both incorporated herein by reference in their entirety.

The compositions for golf ball portions as disclosed herein may be used in sporting equipment in general. Besides their applications in various game balls, these compositions may also be used in golf clubs, such as drivers, woods, irons, or putters, which may comprise a face insert or cavity insert that utilizes one or more of the compositions described herein. The composition may also be used to form portions in golf club shafts, golf shoes, and the like.

All patents and patent applications cited in the foregoing text are expressly incorporated herein by reference in their entirety.

The invention described and claimed herein is not to be limited in scope by the specific embodiments herein disclosed, since these embodiments are intended solely as illustrations of several aspects of the invention. Any equivalent embodiments and various modifications apparent to those skilled in the art are intended to be within the scope of this invention. It is further understood that the various features of the present invention can be used singly or in combination thereof. Such modifications and combinations are also intended to fall within the scope of the appended claims.

What is claimed is:

1. A golf ball comprising a core and a cover, wherein the cover comprises a thermoplastic or thermoset composition comprising a polyurethane prepolymer formed from:
   an isocyanate; and
   a α,ω polyacrylate polyol comprising an acrylate segment with a structure of:

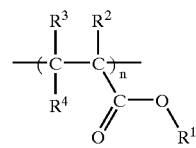

where $R^1$ to $R^4$ are independently hydrogen, aliphatic, alicyclic, aromatic, carbocyclic, heterocyclic, halogenated, perfluoroalkyl, dialkylaminoalkyl, or substituted moieties, each having less than about 20 carbon atoms; and n is an integer from about 2 to about 300.

2. The golf ball of claim 1, wherein:

$R^1$ is methyl, ethyl, propyl, iso-propyl, n-butyl, sec-butyl, t-butyl, hexyl, methylhexyl, ethylhexyl, n-amyl, isoamyl, n-octyl, stearyl, lauryl, cyclohexyl, alkyl, or cycloalkyl moieties;

$R^2$ is hydrogen or methyl moiety; and $R^3$ and $R^4$ are independently hydrogen or saturated moieties.

3. The golf ball of claim 1, wherein the polyacrylate polyol is an $\alpha,\omega$-polyacrylate diol having a formula of:

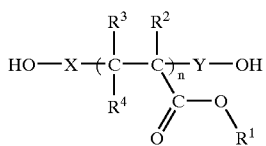

where $R^1$ to $R^4$ are independently hydrogen, aliphatic, alicyclic, aromatic, carbocyclic, heterocyclic, halogenated, or substituted moieties, each having less than about 20 carbon atoms;

X and Y are independently alkyl, aryl, mercaptoalkyl, ether, ester, carbonate, acrylate, halogenated, or substituted moieties; and n is an integer from about 2 to about 300.

4. The golf ball of claim 1, wherein the polyacrylate polyol comprises $\alpha,\omega$-polymethylmethacrylate diol, $\alpha,\omega$-polybutylmethacrylate diol, or $\alpha,\omega$-polyethylhexylmethacrylate diol.

5. The golf ball of claim 1, wherein the polyacrylate polyol is a random, block, or graft copolymer further comprising a long-chain hydrocarbon or an oxyalkylene segment with a structure of:

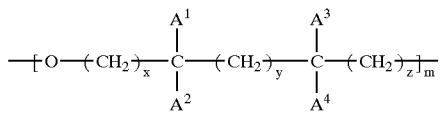

where $A^1$ to $A^4$ are independently hydrogen, alkyl, alkoxy, cycloalkyl, aromatic, heterocyclic, halogenated, or substituted moieties;

x, y, and z are independently zero or integers from about 1 to about 10; and m is an integer from 2 to about 300.

6. The golf ball of claim 5, wherein at least one of $A^1$ to $A^4$ is an alkyl or cycloalkyl moiety having 1 to about 10 carbon atoms.

7. The golf ball of claim 6, wherein the polyacrylate polyol is a telechelic diol having a copolymeric backbone comprising a polytetramethylene ether glycol segment and at least one polyalkylacrylate segment or polyalkylmethacrylate segment.

8. The golf ball of claim 1, wherein the polyacrylate polyol has a glass transition temperature of less than about −10° C.

9. The golf ball of claim 1, wherein the polyacrylate polyol has a glass transition temperature of less than about −30° C.

10. The golf ball of claim 1, wherein the polyacrylate polyol has a molecular weight of about 200 to about 20,000.

11. The golf ball of claim 1, wherein the polyacrylate polyol has a molecular weight of about 1,000 to about 5,000.

12. The golf ball of claim 1, wherein:

the isocyanate is saturated, aliphatic, alicyclic, unsaturated, araliphatic, aromatic, substituted, or unsubstituted, comprising isocyanate-containing monomers, dimers, trimers, adducts, condensates, oligomers, polymers, prepolymers, low-free-monomer prepolymers, quasi-prepolymers, diisocyanates, polyisocyanates, biurets, uretdiones, isocyanurates, or blends thereof; and an equivalent ratio of the polyacrylate polyol to the isocyanate is about 0.01:1 to about 1:1.

13. The golf ball of claim 1, wherein the composition further comprises:

a curing agent comprising saturated or unsaturated monomeric polyahls, oligomeric polyahls, polyether polyahls, polyester polyahls, polycaprolactone polyahls, polycarbonate polyahls, polyhydrocarbon polyahls, polyamide polyahls, polyolefin polyahls, polyamide polyahls, poly(organo)siloxane polyahls, polyahls converted from acid functional oligomers or polymers or ionomers thereof, diols, triols, tetraols, polyols, diamines, triamines, tetramines, polyamines, aminoalcohols, or epoxies; and wherein an equivalent ratio of the polyurethane prepolymer to the curing agent is about 1:0.6 to about 1:1.5.

14. The golf ball of claim 13, wherein the isocyanate, the polyacrylate polyol, the curing agent, and the composition are all substantially saturated.

15. The golf ball of claim 1, wherein the polyurethane prepolymer further comprises a second polyol comprising polyether polyols, polyester polyols, polycaprolactone polyols, polycarbonate polyols, polyhydrocarbon polyols, polyolefin polyols, polyamide polyols, poly(organo)siloxane polyols, polyacrylate polyols, or polyols converted from acid functional oligomers or polymers or ionomers thereof.

16. The golf ball of claim 1, wherein the cover comprises an inner cover layer and an outer cover layer, at least one of which comprises the composition.

17. The golf ball of claim 16, wherein:

the inner cover layer comprises the composition having a first material hardness of about 50 Shore D to about 100 Shore D;

the outer cover layer is formed from a polyurethane or polyurea having a second material hardness of about 30 Shore D to about 70 Shore D and a flexural modulus of about 10,000 psi to about 80,000 psi; and the first material hardness is greater than the second material hardness.

18. The golf ball of claim 16, wherein the inner and outer cover layers each have a thickness of less than about 0.05 inches.

19. The golf ball of claim 1, wherein the core has a diameter of about 1.5 inches to about 1.65 inches.

20. The golf ball of claim 1, wherein the core comprises a center having a diameter of about 0.5 inches to about 1.5 inches, and an outer core layer having a thickness of about 0.01 inches to about 0.5 inches.

21. A golf ball comprising a core and a cover, wherein the cover comprises a thermoplastic or thermoset polyurethane formed from:

a polyurethane prepolymer; and a $\alpha,\omega$ polyahl curing agent having an acrylate segment with a structure of:

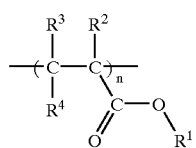

where $R^1$ to $R^4$ are independently hydrogen, aliphatic, alicyclic, aromatic, carbocyclic, heterocyclic, halogenated, perfluoroalkyl, dialkylaminoalkyl, or substituted moieties, each having less than about 20 carbon atoms; and n is an integer from about 2 to about 300.

22. The golf ball of claim 21, wherein the curing agent is an $\alpha,\omega$-polyacrylate telechelic comprising $\alpha,\omega$-polyalkylacrylate diol, $\alpha,\omega$-polyalkylacrylate diamine, $\alpha,\omega$-polyalkylmethacrylate diol, $\alpha,\omega$-polyalkylmethacrylate diamine, $\alpha$-amino-$\omega$-hydroxy-polyalkylacrylate, $\alpha$-amino-$\omega$-hydroxy-polyalkylmethacrylate, or copolymeric polyol or polyamine of polytetramethylene ether glycol and polyalkylacrylate or polyalkylmethacrylate.

23. The golf ball of claim 22, wherein the $\alpha,\omega$-polyacrylate telechelic has a molecular weight of less than about 5,000.

24. The golf ball of claim 21, wherein the polyurethane prepolymer comprises:

a polyol comprising polyether polyols, polyester polyols, polycaprolactone polyols, polycarbonate polyols, polyhydrocarbon polyols, polyolefin polyols, polyamide polyols, poly(organo)siloxane polyols, polyacrylate polyols, or polyols converted from acid functional oligomers or polymers or ionomers thereof; and an isocyanate comprising isocyanate-containing monomers, dimers, trimers, adducts, condensates, oligomers, polymers, prepolymers, low-free-monomer prepolymers, quasi-prepolymers, diisocyanates, polyisocyanates, biurets, uretdiones, isocyanurates, or blends thereof; and wherein an equivalent ratio of the polyol to the isocyanate is about 0.3:1 to about 0.6:1.

25. A golf ball comprising a core, a cover, and at least one layer comprising a thermoplastic or thermoset composition comprising an $\alpha,\omega$-polyacrylate telechelic polyahl, an isocyanate, and an optional curing agent, wherein the at least one layer is an outer core layer, a barrier layer, an intermediate layer, an inner cover layer, or a coating layer.

26. The golf ball of claim 25, wherein the composition forms a polyurethane, and the $\alpha,\omega$-polyacrylate telechelic comprises an $\alpha,\omega$-polyacrylate diol.

27. The golf ball of claim 25, wherein the composition forms a polyurea, and the $\alpha,\omega$-polyacrylate telechelic comprises an $\alpha,\omega$-polyacrylate diamine.

28. The golf ball of claim 25, wherein the $\alpha,\omega$-polyacrylate telechelic, the isocyanate, and the curing agent are all substantially saturated.

* * * * *